United States Patent
Yoshida (10) Patent No.: US 7,929,158 B2
(45) Date of Patent: Apr. 19, 2011

(54) IMAGE FORMING APPARATUS

(75) Inventor: Shigetaka Yoshida, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 926 days.

(21) Appl. No.: 11/688,632

(22) Filed: Mar. 20, 2007

(65) Prior Publication Data

US 2007/0222802 A1    Sep. 27, 2007

(30) Foreign Application Priority Data

Mar. 24, 2006   (JP) ................. 2006-084262

(51) Int. Cl.
   G06F 15/00    (2006.01)
   G06F 17/00    (2006.01)
(52) U.S. Cl. ...................... 358/1.13; 715/256
(58) Field of Classification Search ............... 358/1.13, 358/1.15, 1.14, 1.16, 1.18, 1.9, 1.1, 538, 358/518; 715/201, 239, 256, 744, 751, 737; 369/53.21, 53.11, 47.12; 700/245, 216, 18, 700/87; 382/100, 276, 201, 294, 254
   See application file for complete search history.

(56) References Cited

U.S. PATENT DOCUMENTS

| 6,469,770 | B2 | 10/2002 | Hoshino |
| 6,774,980 | B2 * | 8/2004 | Hoshino et al. ............... 355/40 |
| 7,646,517 | B2 * | 1/2010 | Maki et al. .................. 358/538 |
| 2005/0270579 | A1 | 12/2005 | Hibi et al. |
| 2007/0223013 | A1 | 9/2007 | Mizutani |
| 2007/0226748 | A1 | 9/2007 | Mizutani |

FOREIGN PATENT DOCUMENTS

| JP | 11-321009 A | 11/1999 |
| JP | 2001-111928 A | 4/2004 |
| JP | 2004-255729 A | 9/2004 |
| JP | 2005-349822 A | 12/2005 |

* cited by examiner

Primary Examiner — Saeid Ebrahimi Dehkordy
(74) Attorney, Agent, or Firm — Banner & Witcoff, Ltd.

(57) ABSTRACT

An image forming apparatus includes a controller that is operable to: access files that is created by an external device and stored in the external storage device, the files containing images that are to be formed on the sheet by the image forming unit; generate auxiliary identification information including character string that is uniquely assigned for each of the files and for each of folders containing the files by using character information stored in a storage; control at least one of the display and the image forming unit to display file specifying information including filenames of each of the files and the auxiliary identification information so as that the auxiliary identification information is displayed preferentially from the filenames; and allow a user to select a target file that contains an image to be formed on the sheet based on the file specifying information.

11 Claims, 10 Drawing Sheets

| | |
|---|---|
| 1 ?? | 4: Sample1-2-1.pdf |
| 1 ?? | 5: 20060125Sample1- |
| 1 ?? | 6: 20060125Sample1- |
| 1 ?? | 7: Sample1-1-3.pdf |
| 1 ?? | 8: ?????.pdf |
| 2 ?? | 9: ?????.pdf |
| 2 ?? | 10: Sample1-2-1.pdf |
| 2 ?? | 11: 20060125Sample1- |

IMAGE FORMING APPARATUS

CROSS-REFERENCE TO RELATED APPLICATION

This application claims priority from Japanese Patent Application No. 2006-084262, filed on Mar. 24, 2006, the entire subject matter of which is incorporated herein by reference.

TECHNICAL FIELD

Aspects of the present invention relate to an image forming apparatus such as a printer.

BACKGROUND

Some of image forming apparatuses, such as printers and MFPs (Multiple Function Peripherals), are provided with a function called "direct printing function" that enables a user to select files stored in a storage device, such as a USB memory device, which is attached thereto, and prints out an image contained in the selected files. According to this direct printing function, the user can freely print out an image without using a PC. Also, some image forming apparatuses are provided with an index printing function for reading files stored in a storage device, summarizing a plurality of images contained in the files, and printing thumbnails of the images on one sheet of paper. For example, see JP-A-2005-349822, which is also published as US 2005/0270579 A1.

In a conventional image forming apparatus that is provided with the direct printing function, there is proposed a technique to: 1) perform the index printing function to generate and print thumbnails of the images contained in the files stored in the storage device, 2) allow a user to specify target images to be print out with the thumbnail image printed out, 3) allow the user to select the target images by selecting filenames displayed on a display of the image forming apparatus, and 4) perform the direct printing function for the selected target images.

However, in a case where the filename of the file stored in the storage device includes a character that is not displayable on the display, or in a case where a plurality of files are displayed with a same filename on the display due to an limitation of numbers of characters displayable on the display, the user is unable to correctly select the target image based on the displayed filenames, thereby causing an erroneous print out. Also, excessive amount of time may be spent by the user in selecting the target images.

The user often creates some folders (directories) in the storage device, and stores a plurality of files relating to each of related jobs and for each of predetermined versions of products in each of the folders. In such case, since files with the same filename can also be respectively stored in different folders, the user may not be able to determine which file relates to which only from the filename. If the user remembers a name of the folder (folder name), the user can distinguish a desired file based on the name of the folder. However, in a case where the folder name of the folder includes a character that is not displayable on the display, or in a case where a plurality of folders are displayed with a same folder name on the display due to the limitation of numbers of characters displayable on the display, the user is unable to specify the folders or the files stored in the folders.

SUMMARY

According to an aspect of the present invention, there is provided an image forming apparatus including: an image forming unit that forms an image on a sheet; a display; a storage that stores character information that defines shapes of characters to form image of characters; a device interface that is connectable with an external storage device; and a controller. The controller is operable to: access files that is created by an external device and stored in the external storage device, the files containing images that are to be formed on the sheet by the image forming unit; generate auxiliary identification information including character string that is uniquely assigned for each of the files and for each of folders containing the files by using the character information stored in the storage; control at least one of the display and the image forming unit to display file specifying information including filenames of each of the files and the auxiliary identification information so as that the auxiliary identification information is displayed preferentially from the filenames; and allow a user to select a target file that contains an image to be formed on the sheet based on the file specifying information.

DESCRIPTION

Examples of the present invention will be described below by referring to the accompanying drawings. It is to be understood that the following example is merely an example in which the present invention is embodied and, as a matter of course, the example can be appropriately modified without changing the spirit and scope of the present invention.

First Example

Figure 1:
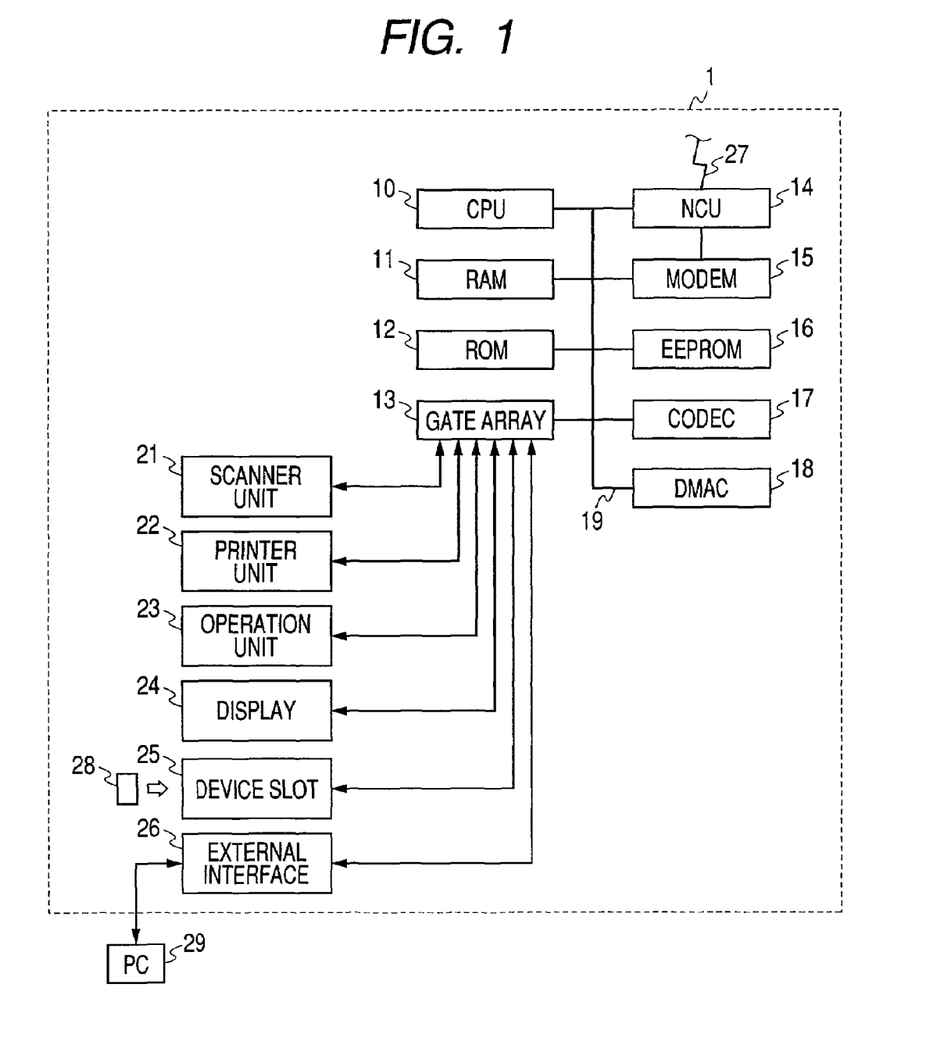
FIG. 1 is a block diagram showing a printer as an example of the present invention.

FIG. 1 is a block diagram showing a multi-function device 1 according to a first example of the present invention. The multi-function device 1 is configured to perform a plurality of functions to be served as a printer, a scanner, a facsimile machine, and a coping machine. The multi-function device 1 includes a CPU 10, a RAM 11, a ROM 12, a gate array 13, an NCU (Network Control Unit) 14, a modem 15, an EEPROM 16, a CODEC 17, and a DMAC (Direct Memory Access Controller) 18. These components are mutually connected with one another through a bus line 19. The bus line 19 includes an address bus, a data bus, and a control signal line. A scanner unit 21, a printer unit (image forming unit) 22, an operation unit 23, a display 24, a device slot 25 and an external interface 26 are connected to the gate array 13. A public telephone network 27 is connected to the NCU 14.

Figure 2:
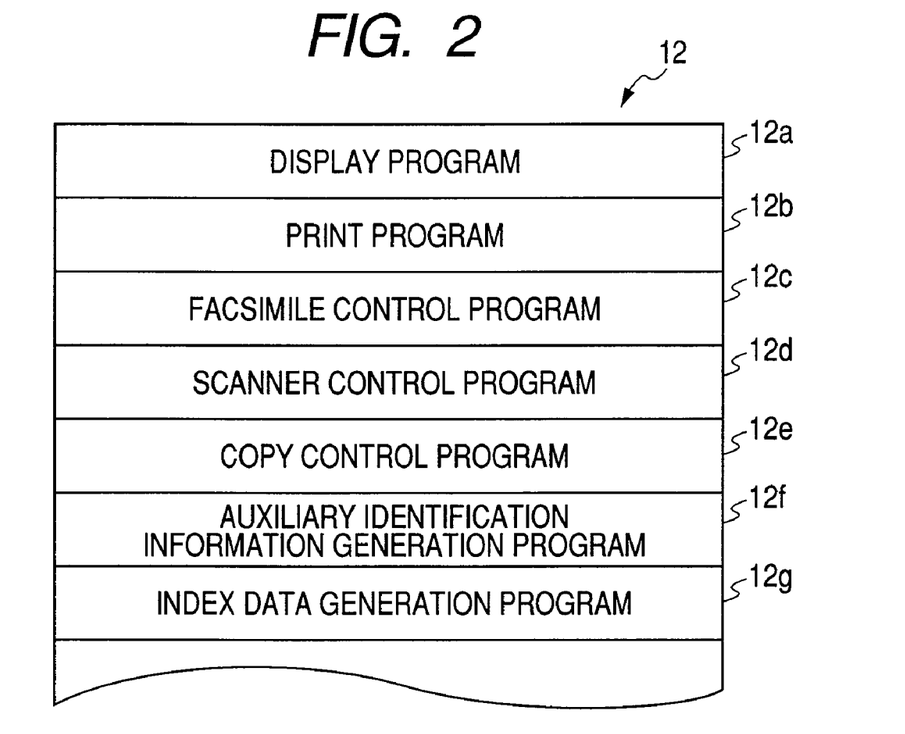
FIG. 2 shows examples of programs stored in a ROM.

The CPU 10 controls the entire operation of the multi-function device 1. As shown in FIG. 2, the ROM 12 stores various programs such as a display program 12a, a print program 12b, a facsimile control program 12c, a scanner control program 12d, a copy control program 12e, an auxiliary identification information generation program 12f and an index data generation program 12g.

The display program 12a controls the display 24 to display information such as a filename and an image (print image). The print program 12b controls the printer unit 22 to form an image on a sheet of paper. The auxiliary identification information generation program 12f is a program for adding identification information to the filename using standard resource. The index data generation program 12g is a program for summarizing a plurality of images and performing index printing for printing thumbnails of the images on one sheet of paper.

The CPU 10 reads out the display program 12a, the print program 12b, the auxiliary identification information generation program 12f and the index data generation program 12g, to be served as a part of a filename display unit, an auxiliary identification information generation unit, a filename control unit, a print image auxiliary output unit and display mode switching unit.

The facsimile control program 12c, scanner control program 12d and copy control program 12e, which are stored in the ROM 12, are provided for performing various functions for the multi-function device 1 to be served as the facsimile machine, the scanner, and the coping machine, respectively.

The multi-function device 1 is provided with the NCU 14. The NCU 14 is connected to a public telephone network 27, and performs network control such as connection and disconnection of a circuit. The RAM 11 is used as a line buffer memory for work area of the CPU 10 and extracting area of the scanned image. The modem 15 modulates and demodulates facsimile data. The ROM 12 stores data such as configuration values as well as the various programs shown in FIG. 2. The ROM 12 stores standard character resource (for example, characters including, numbers, alphabet and symbols), which are displayable on the display 24, are respectively stored in association with character resource information (font resource). The character resource information includes shapes of characters. The ROM 12 serves as a character resource storage. The EEPROM 16 stores various types of flags and configuration information. The CODEC 17 codes and decodes the facsimile data. The DMAC 18 mainly reads and writes data stored in the RAM 11.

In the present example, the standard character resource and the character resource information serves as character information that indicates characters that are displayable on the display 24.

The gate array 13 serves as an input/output interface of the CPU 10 and each components such as the scanner unit 21. The scanner unit 21 is provided with an image sensor and an LED light source and scans images such as characters and figures from a document (original). The printer unit 22 prints the images such as the characters and the figures on a sheet using, for example, an inkjet method or a heat transfer method. The operation unit 23 is provided with button groups such as numerical keys and character keys, and transmits commands to the CPU 10 according to the operations input by a user. The display 24 is provided with a display device such as an LCD panel, and displays operation statuses and operation guidance for the user.

The device slot 25 is provided with a plurality of connectors for connecting a plurality of types of a storage device 28 that is equipped with rewritable flash memories. The storage device 28 may be a device such as smart media® and compact flash®, and an USB (Universal Serial Bus) memory device. The storage device 28 is detachable from the device slot 25. The device slot 25 serves as a reader/writer for reading and writing data to the storage device 28. The external interface 26 is provided with a connection port corresponding to standards such as Centronics parallel interface or USB, and exchanges data and signals with a personal computer (PC) 29.

In the present example, the device slot 25 and the external interface 26 serves as a device interface that is connectable with an external storage device (storage device 28 and PC 29).

The multi-function device 1 according to the first example can perform data operation processing for transmitting the data stored in the storage device 28 inserted into the device slot 25 to the personal computer 29, or deleting the data stored in the storage device 28, in accordance with an access from the personal computer 29. The multi-function device 1 can read and write data from different types of storage device 28 that is connectable thereto.

The multi-function device 1 is provided with a so-called direct printing function in addition to a function for printing data as the peripheral equipment of the personal computer 29. The direct printing function reads and prints the data directly from the storage device 28 by inserting the storage device 28 used in a digital camera into the device slot 25. The multi-function device 1 adds auxiliary identification information to the filename of a file stored in the storage device 28 and displays the filename to which the auxiliary identification information is added when displaying the filename of a target file to be printed on the display 24.

The multi-function device 1 is also provided with an index printing function, and can print out the auxiliary identification information with the print image in association with the filename. Thereby, even when the filename is not correctly displayed or printed out, the user can identify the target file using the auxiliary identification information based on the result of the index printing to which the auxiliary identification information is added or the display of the display 24.

The incorrect display or printout of the filename may be caused due to various reasons, such as unavailable character code resulting a display or printout of garbled characters, or a limited number of characters that is displayable on the display 24 or printable by the printer unit 22 in a limited space for each files.

The character resource information includes, for example, font type specifying information and character codes on a font table (for example, JIS, Shift JIS, or ASCII). The character codes on the table are often shared among a plurality of fonts. However, when the fonts are different, the same code often corresponds to different character. A specific character is not assigned to a specific character code group depending on the font, and substitution characters such as a blank (space) and a common symbol (for example, a box "☐") may be uniformly assigned. Therefore, when the font, which is not stored as a display font in the multi-function device 1, is used for a filename of the file or a folder name of a folder (directory) in which the file is contained, the character must be correctly displayed in the character code of the font that is originally intended to be used. However, when the font is substituted by the display font at the printer unit 22, the font of the corresponding character code is displayed by different characters and substitution characters to lead to garbled characters.

Figure 3:
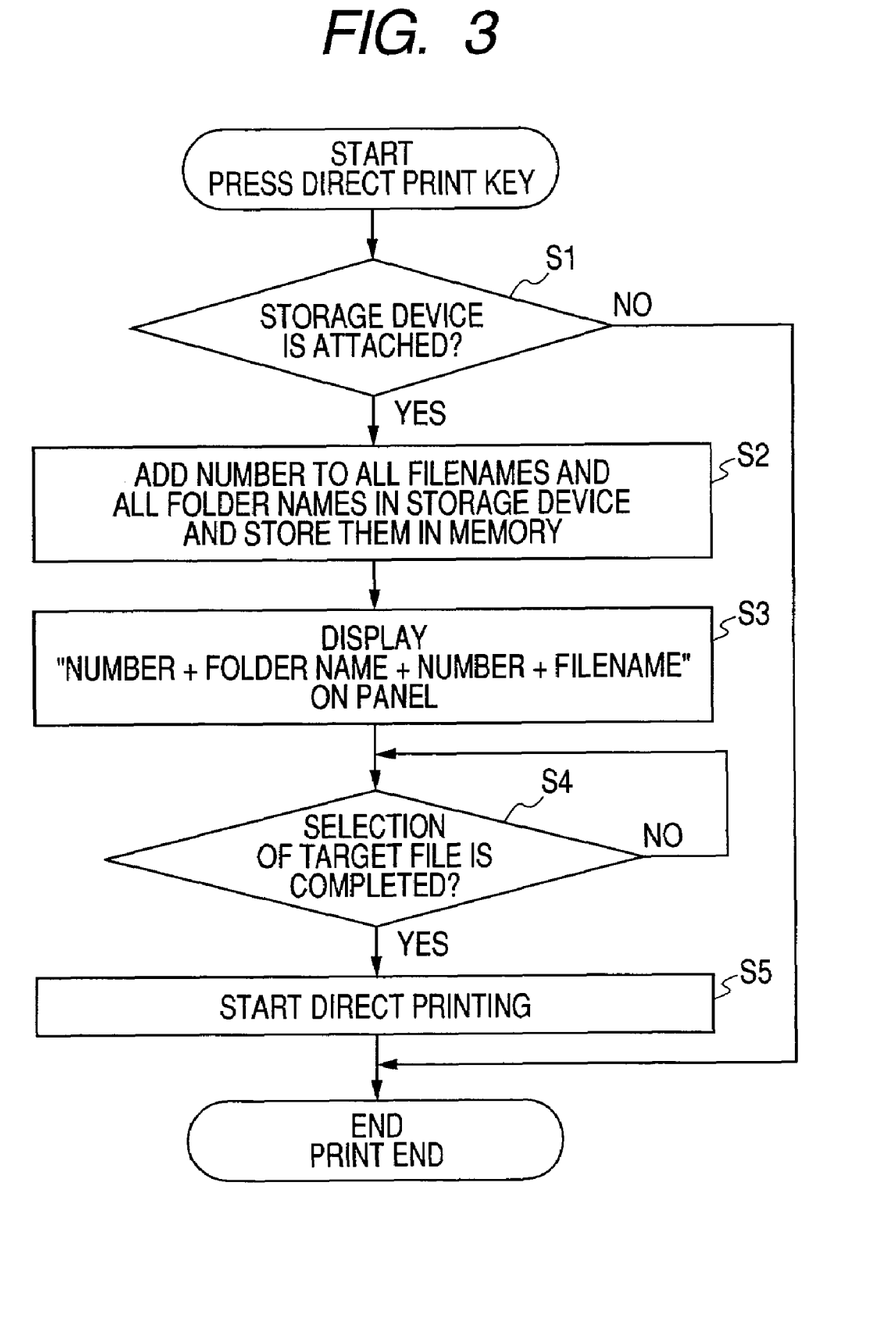
FIG. 3 is a flowchart showing a first example of direct printing.

A direct printing processing when displaying the auxiliary identification information on the panel of the display 24 is shown in FIG. 3. When the user presses a direct print button in the button group of the operation unit 23 of the multi-function device 1, the multi-function device 1 starts the direct printing processing according to the flowchart of FIG. 3 in order to directly print an image contained in the file stored in the storage device 28.

First, the CPU 10 of the multi-function device 1 determines whether the storage device 28 is attached to the device slot 25 (S1). When the storage device 28 is not attached, the CPU 10 determines that the target file as the object of the direct printing does not exist, and terminates the direct printing processing.

When the storage device 28 is attached to the device slot 25 (S1: YES), the CPU 10 adds numbers (numbers: 1, 2, 3, 4 . . . ) as the auxiliary identification information to all the filenames and folder names of the files stored in the storage device 28, and stores the updated names in the memory (RAM 11) (S2). The RAM 11 serves as the target file storage. Next, the CPU 10 of the multi-function device 1 displays the files stored in the storage device 28 in the form of "number+folder name+number+filename" on the panel of the display 24 (S3).

Figure 4:
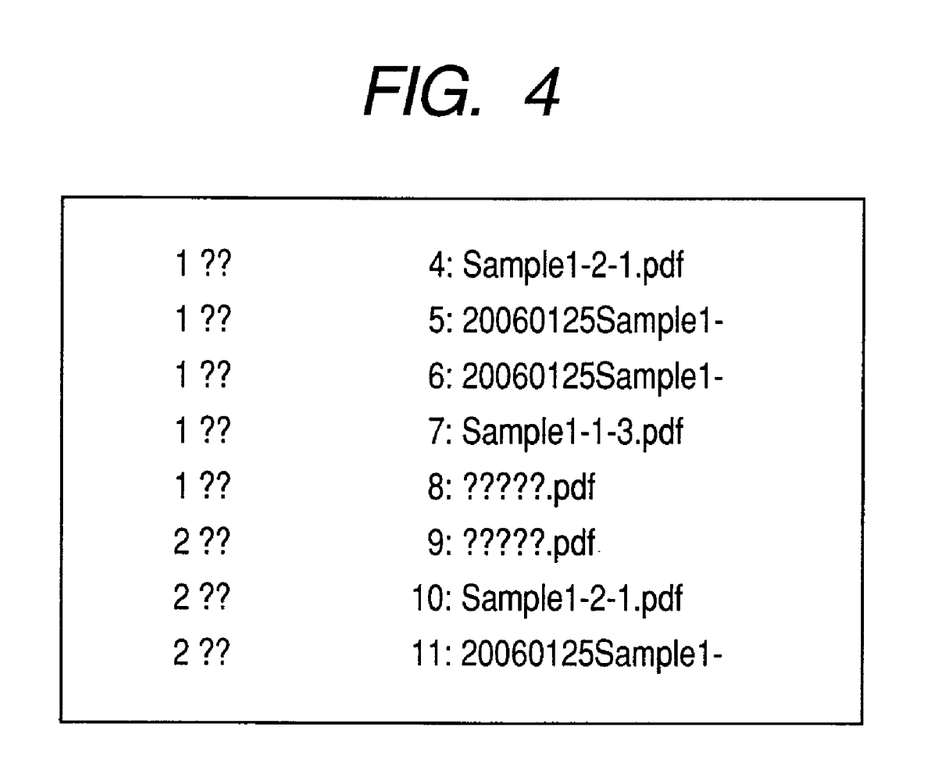
FIG. 4 shows an example of panel display in the first example.

An example of the panel display is shown in FIG. 4. As shown in FIG. 4, the number as the auxiliary identification information is added to the head of each filename and folder name of the target file which are displayed on the panel, and is displayed. That is, the auxiliary identification information is preferentially displayed. FIG. 4 shows that the folder names, to which numbers 1, 2 are added, and the filenames, to which the numbers 4 to 8 stored in the folder are added, are displayed. Even the garbled folder names (the numbers 1, 2 are added in FIG. 4), and the filenames (the numbers 8 and 9 are added in FIG. 4), in other words, the folder names and filenames which are described using the character resource which is not contained in the standard resource can be easily identified by adding the number as the auxiliary identification information. Also, the target files (the numbers 5, 6, 11 are added in FIG. 4) in which the filename exceeds the character limitation of the display 24, and which has the same display as that of the other target file in the displayed part, in other words, the files whose character string of the head within the displayable range corresponds to each other can be identified using the auxiliary identification information.

In addition, since the folder name of the folder in which the target file is stored in front of the filename is displayed in a state that a number is added, the user can grasp that even the target file (for example, in the file to which the number 1 is added and the file to which the number 10 is added) which is the same filename is stored in another folder. Since the number is added to the folder name of the folder in which the target file is stored, even if two completely identical folder names are displayed due to garbled characters, the user can determine the target file in which the target file to which the number 1 is added and the target file to which the number 10 is added are stored in different folders. Furthermore, the user can determine whether any of the target files to which the number 1 is added and target files to which the number 10 is added is a desired target file from the filename of the target file or the number added to the target file respectively stored in the same folder.

Referring back to FIG. 3, it is assumed that the user can identify the target file using the number and select the target file. If the selection of the target file which is subjected to the direct printing by the user is completed (S4: YES), the CPU 10 of the multi-function device 1 starts the direct printing of the selected target file by executing the print program 12b (S5).

Second Example

Figure 5:
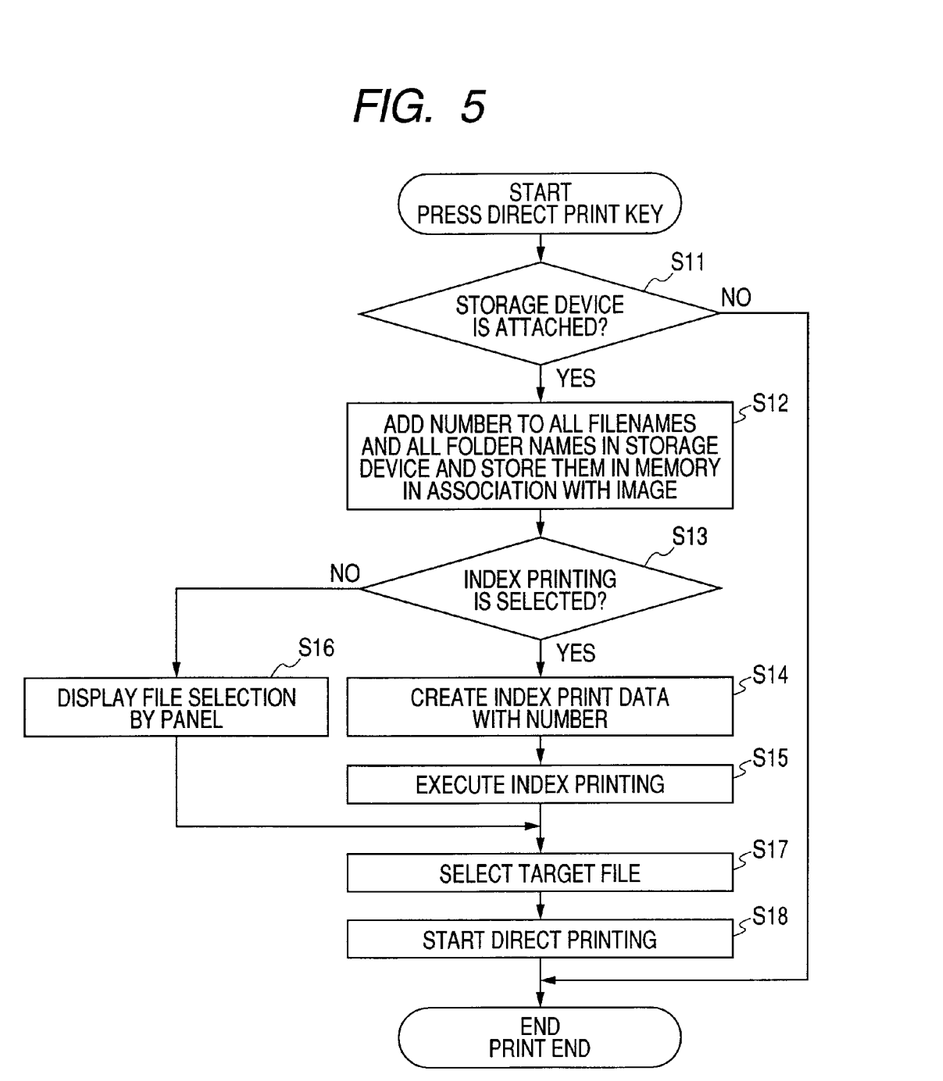
FIG. 5 is a flowchart showing a second example of direct printing.

A detail of the direct printing processing to be performed in combination with the index printing will be described with reference to FIG. 5. First, the CPU 10 of the multi-function device 1 determines whether the storage device 28 is attached to the device slot 25 (S11). When the storage device 28 is not attached, the CPU 10 determines that the target file as the object of the direct printing does not exist, and terminates the direct printing processing.

When the storage device 28 is attached to the device slot 25 (S11: YES), the CPU 10 adds numbers (characters) as the auxiliary identification information to all the filenames and folder names of the files stored in the storage device 28. The CPU 10 stores the updated names in the memory (RAM 11) so as to associate the numbers with the image (print image) based on the file (S21).

The CPU 10 monitors whether the index printing is selected by the user. If the index printing is selected (S13: YES), the CPU 10 executes the auxiliary identification information generation program 12f and the index data generation program 12g, and adds the number as the auxiliary identification information, to generate index print data with the number (S14). Then, the CPU 10 executes the print program 12b, and executes the index printing (S15).

Figure 6:
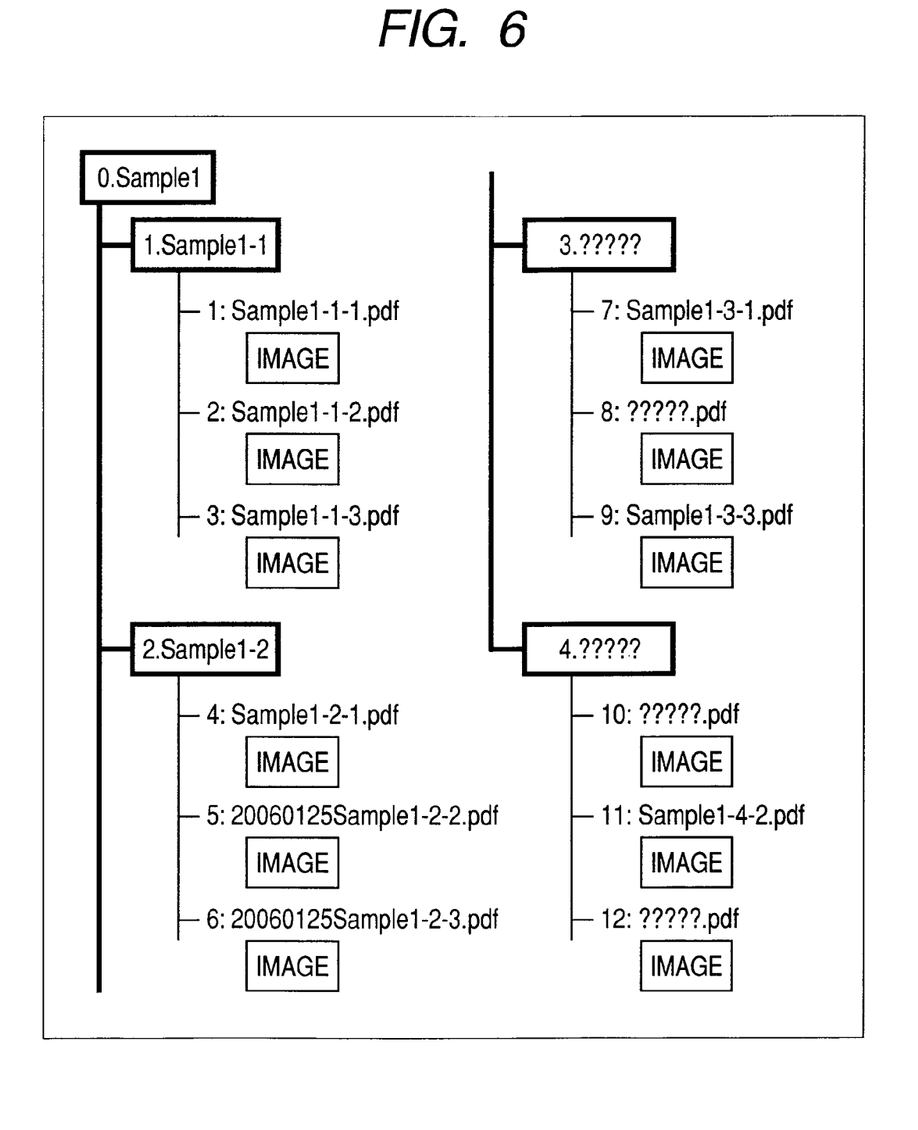
FIG. 6 shows an example of index printing in the second example.

FIG. 6 shows an example in which the numbers are added to all the target files and folder names of the files and the index printing is executed in a state that the images (print images) are displayed as a list. That is, the print image based on each of the files to which the auxiliary identification information is applied is printed out in association with the auxiliary identification information. The numbers (auxiliary identification information) are added to all the filenames and folder names of the target files and are printed out with the image (print image). Thereby, even if the garbled filename is illegible, the target file can be specified by the numbers added to the filenames of the target images and folder names of the folder containing the target file.

On the other hand, when the index printing is not selected by the user in S13 (S13: NO), the CPU 10 executes the file selection display which displays the filename and the folder name of the target file on the panel (S16). The user performs the filename selection for printing using the number (S17), and the CPU 10 of the multi-function device 1 executes the direct printing of the target file (S18).

Third Example

Figure 7:
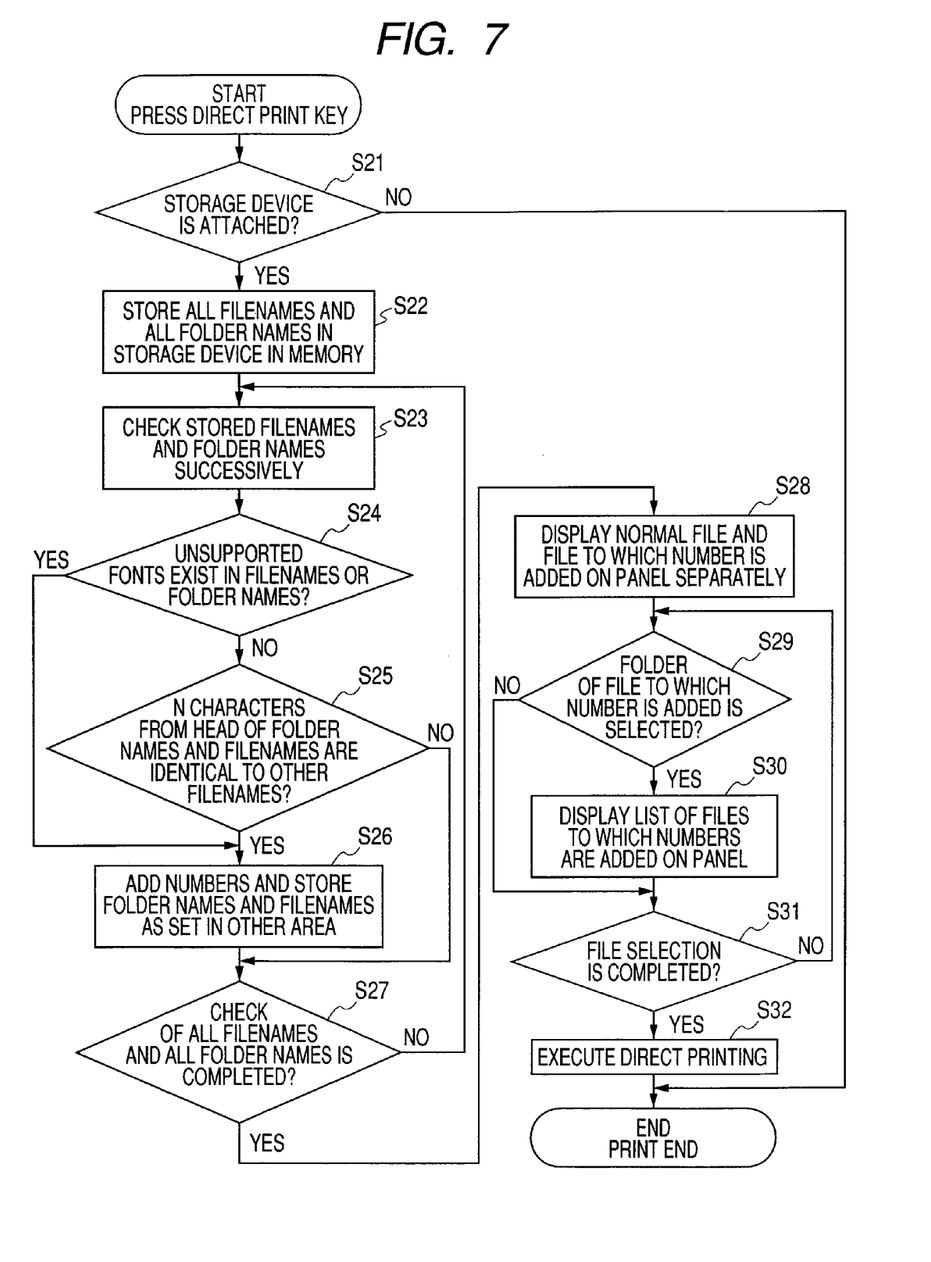
FIG. 7 is a flowchart showing a third example of direct printing.

A detail of the direct printing processing to be performed in combination with the index printing, while adding the numbers (the auxiliary identification information) to only the filenames and folder names that are garbled or illegible, will be described with reference to FIG. 5. First, the CPU 10 determines whether the storage device 28 is attached to the device slot 25 (S21). When the storage device 28 is not attached, the CPU 10 determines that the target file as the object of the direct printing does not exist, and terminates the direct printing processing.

If the storage device 28 is attached to the device slot 25 (S21: YES), the CPU 10 stores all the filenames and folder names of the files stored in the storage device 28 in the memory (RAM 11) (S22).

Next, the CPU 10 executes the auxiliary identification information generation program 12f to check the filenames and folder names of the files stored in the RAM 11 (S23). If unsupported fonts (the fonts which are not contained in the standard character resource and are not displayable on the display 24) are contained in the filename or the folder name (S24: YES), the process proceeds to S26. If the unsupported fonts are not contained in the filenames or the folder names (S24: NO), the CPU 10 determines whether N characters (N is the number of characters which can be displayed in order to display one folder name and filename on the panel of the display 24) from the heads of the filenames or folder names are the same as the other files. That is, the CPU 10 determines whether or not the files in which the folder names and the filenames are displayed by the same name on the display 24 exist (S25).

If the target files in which N characters from the heads of the folder names and filenames are the same as the other folder names and filenames, i.e., the target files in which the displays of the folder names and filenames are the same exist (S25: YES), the numbers are added to the folder names and the filenames, and the folder names and the filenames are stored in another area of the memory (RAM 11) as a set (S26). The CPU 10 determines whether the check of all the filenames and folder names of the target files is completed (S27), and the process returns to S23 if the check of all the filenames and folder names of the target files is not completed (S27: NO). If the check of all the filenames and folder names of the target files is completed (S27: YES), the CPU 10 controls the display 24 to display the files and folders with original names and files and folders with the numbers being added.

Figure 8:
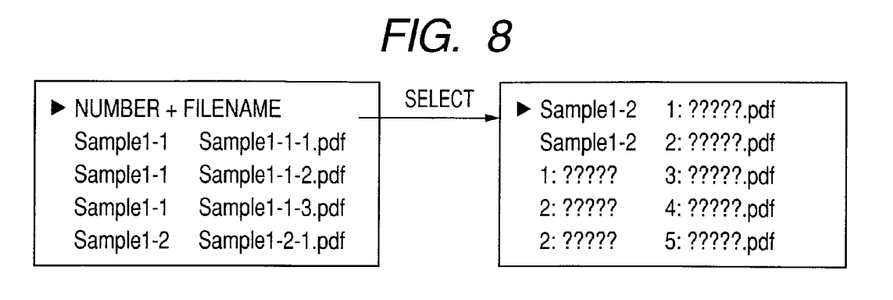
FIG. 8 shows an example of panel display in the third example.

An example of display by the display 24 is shown in FIG. 8. An item "Number+filename" and the files with the original filenames are displayed on the panel. When the item "number+filename" is selected by the user (S29: YES), the list of the folder names and filenames to which the numbers are added is displayed (S30).

In this case, only the filenames and folder names to which the number is added may be exclusively displayed. Alternatively, the filenames and folder names to which the number is added may be preferentially displayed above the list of the filenames and folder names having the original names.

Figure 9:
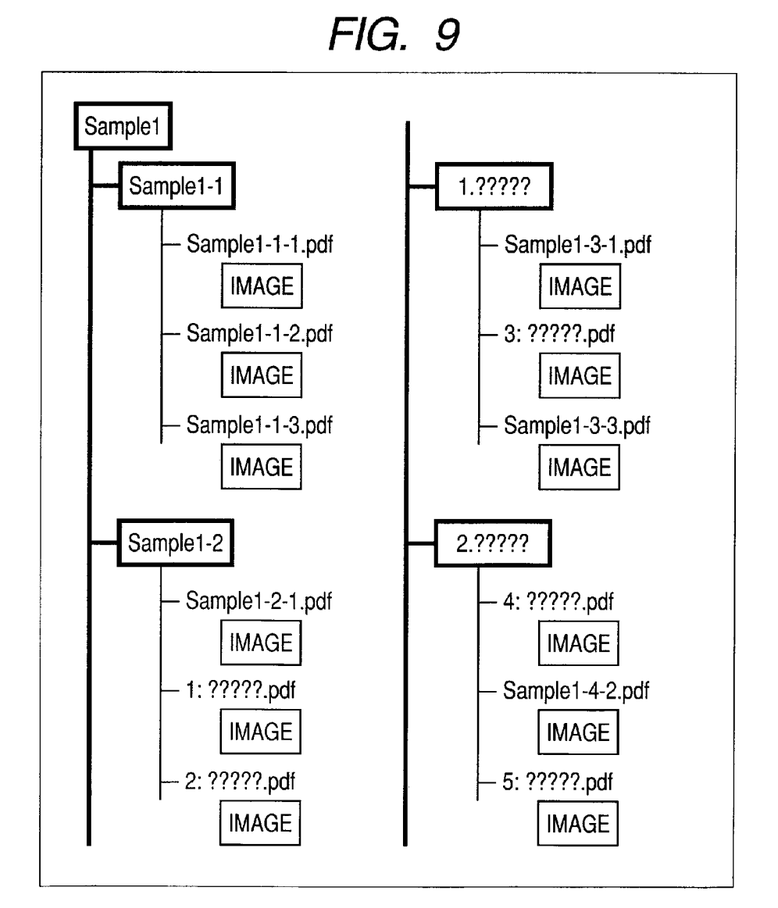
FIG. 9 shows an example of index printing in the third example.

If the selection of the file to be directed to the direct printing is completed by the user (S31: YES), the direct printing is executed (S32). An example of a printout obtained by executing the index printing is shown in FIG. 9. The numbers are added only to the filenames and folder names containing undisplayable character as shown in FIG. 9. As shown in FIG. 9, the filenames or folder names containing the character resource that is not supported in the standard character resource are extracted as the unspecific name, and the auxiliary identification information is applied to the unspecific name. The auxiliary identification information is not output to files in which the filenames and the folder names of the target files are not the unspecific name, i.e., files in which the filenames and the folder names of the files are normally displayed.

Fourth Example

Figure 10:
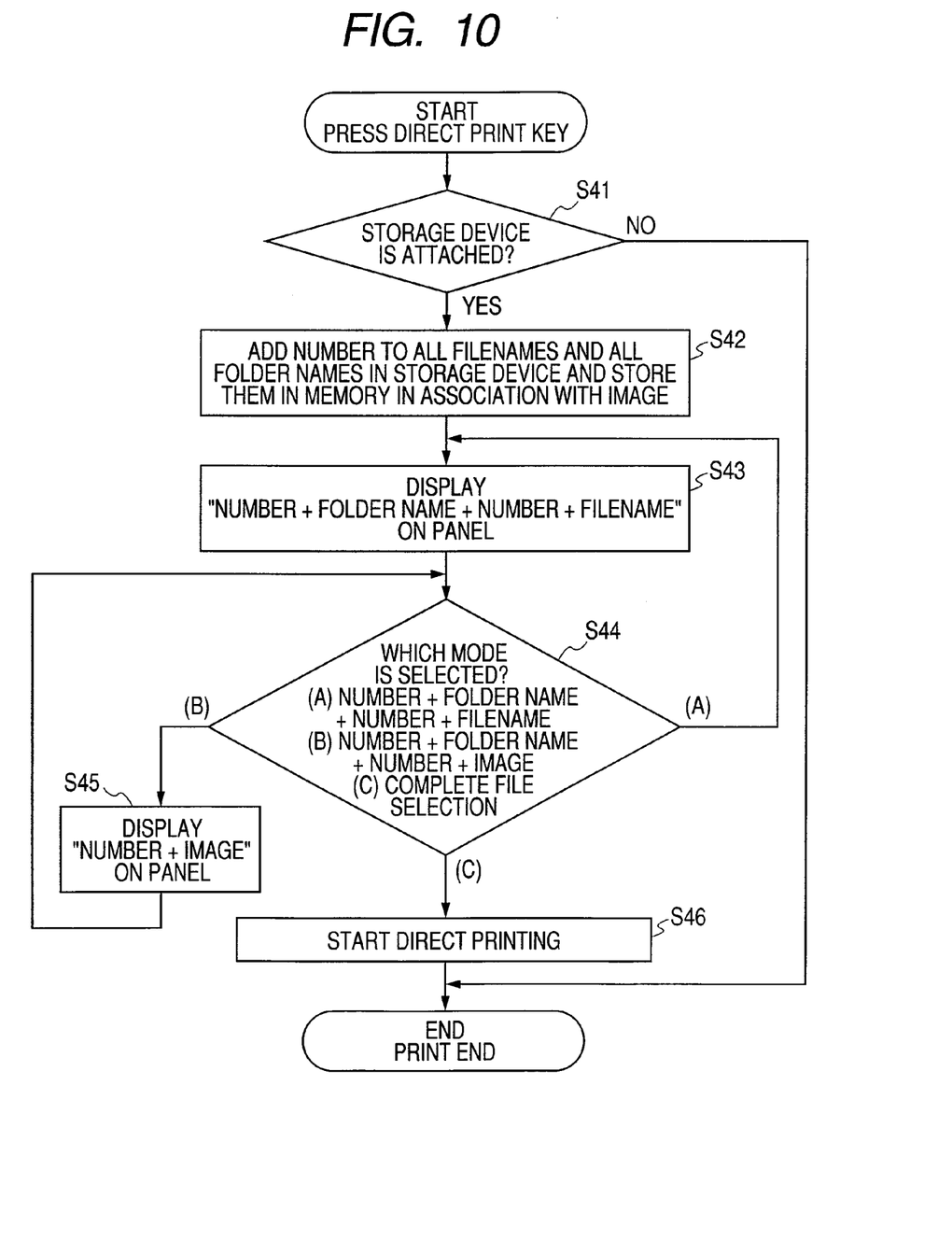
FIG. 10 is a flowchart showing a fourth example of direct printing.

An example of the direct printing processing to be performed in a case where displaying an image contained in each of the files stored in the storage device 28 on the display 24 will be described with reference to FIG. 10. When the user presses the direct print button provided on the multi-function device 1, the multi-function device 1 starts a direct printing processing according to a flowchart shown in FIG. 10.

First, the CPU 10 determines whether the storage device 28 is attached to the device slot 25 (S41). When the storage device 28 is not attached, the CPU 10 determines that the target file as the object of the direct printing does not exist, and terminates the direct printing processing.

If the storage device 28 is attached to the device slot 25 (S41: YES), the CPU 10 of the multi-function device 1 adds the numbers as the auxiliary identification information to all the filenames and folder names of the files stored in the storage device 28, and stores the updated names in the RAM 11 (S42).

The CPU 10 controls the display 24 to display each files in a format of "number+folder name+number+filename" on the display 24 (S43). Next, the CPU 10 determines which one of modes is selected by the user (S44). If the mode of "number+folder name+number+filename" is selected (A in S44), the process returns to S43. If the mode of "number+folder name+number+image" is selected (B in S44), the CPU 10 controls the display 24 to display each files in a format of "number+image" (S45).

Figure 11:
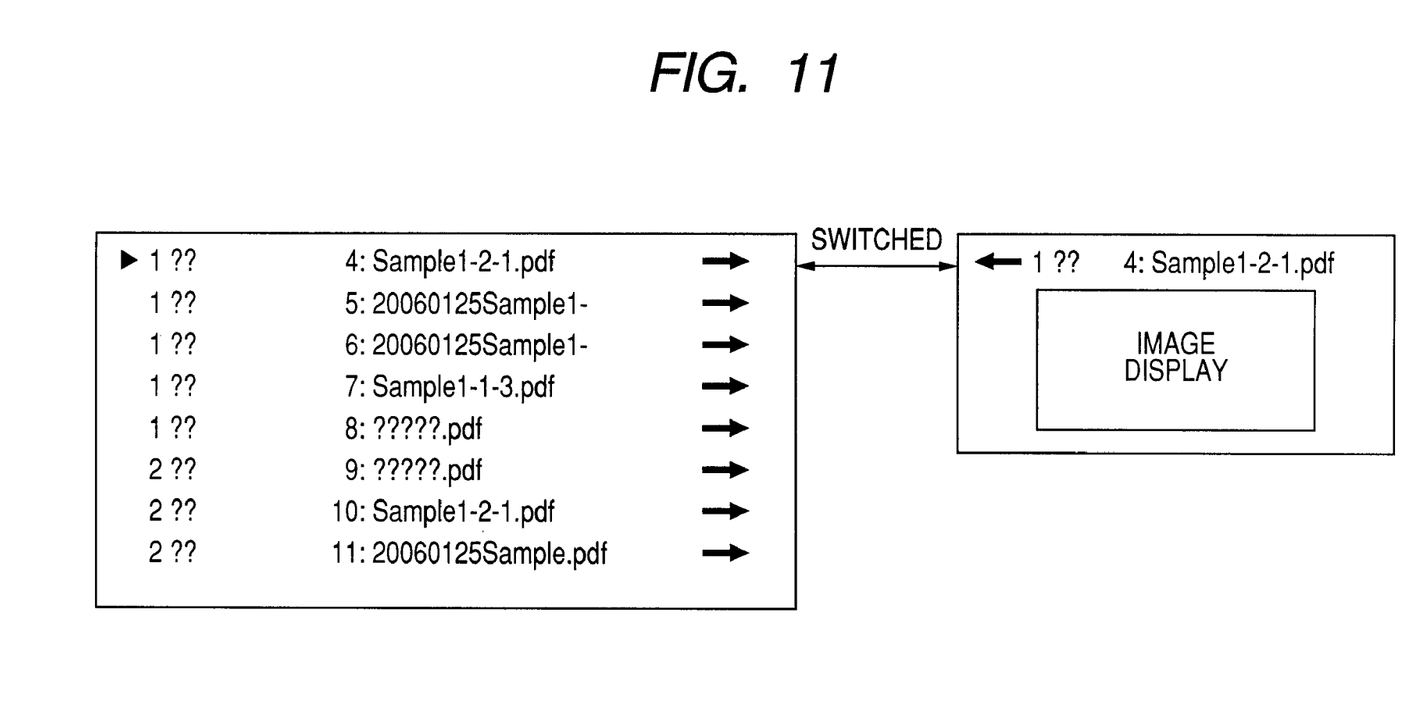
FIG. 11 shows an example of panel display in the fourth example.

An example of a display shown by the display 24 is shown in FIG. 11. In the left part of the figure shown in FIG. 11, an example displayed on the display 24 is shown in which each of the files is displayed in a format of "number+folder name+number+filename." If the mode of "number+folder name+number+image" is selected, as shown in the right part of the figure in FIG. 11, the selected file is displayed in a format of "number+folder name+number+image". That is, in this example, two modes of: 1) a list display mode for displaying each of the files by the filenames and the folder names as a list on the display 24 without the image contained in the files, and 2) an image display mode for displaying a filename and a folder name of the selected file with an image contained in the selected file, are provided for the user to be switchable.

If a selection of a target file by the user is completed in S44 (C in S44), the CPU 10 starts the direct printing of the selected file (S46).

As described above, the multi-function device 1 adds the auxiliary identification information, such as numbers and characters, to the filenames and folder names of the files stored in the storage device 28. The multi-function device 1 then displays or prints out the list of the files with the updated names. Accordingly, the user can easily identify a target file to be print out even in a case where the filename of the file created by an external devices includes a character noncompliant with the display 24. In addition, the multi-function device 1 can prevent a problem that a plurality of files that are displayed as the same filename on the display 24 due to the limitation of the display 24.

What is claimed is:

1. An image forming apparatus comprising:
   an image forming unit that forms an image on a sheet;
   a display;
   a storage that stores character information that defines shapes of characters to form image of characters;
   a device interface that is connectable with an external storage device; and
   a controller that is operable to:
   access files that are created by an external device and stored in the external storage device, the files containing images that are to be formed on the sheet by the image forming unit;
   generate auxiliary identification information including a character string that is uniquely assigned for each of the files and for each of a plurality of folders containing the files by using the character information stored in the storage;

control at least one of the display and the image forming unit to display file specifying information including filenames of each of the files and the auxiliary identification information so as that the auxiliary identification information is displayed preferentially from the filenames; and allow a user to select a target file that contains an image to be formed on the sheet based on the file specifying information.

2. The image forming apparatus according to claim 1, wherein the character string has a length shorter than a length of a filename displayable for each of the files.

3. The image forming apparatus according to claim 1, wherein the controller is further operable to control at least one of the display and the image forming unit to display an image contained in each of the files in association with the file specifying information.

4. The image forming apparatus according to claim 3, wherein the controller controls the image forming unit to display the image in association with the file specifying information.

5. The image forming apparatus according to claim 4, wherein the controller controls the image forming unit to display the image in association with the file specifying information for each of the files as a list.

6. The image forming apparatus according to claim 1, wherein the controller is further operable to allow the user to select a target folder from among the folders, and wherein the controller controls the image forming unit to form images contained in files contained in the target folder.

7. The image forming apparatus according to claim 1, wherein the controller is further operable to allow the user to select one of a plurality of modes of a list display mode for displaying the file specifying information for each of the files without displaying images contained in the files and an image display mode for displaying the file specifying information for each of the files in association with images contained in the files.

8. The image forming apparatus according to claim 1, wherein the controller is further operable to extract filenames or folder names of the files and the folders, which include characters that the shape is not defined in the character information, as unspecific names, and wherein the controller adds the auxiliary identification information to the unspecific names.

9. The image forming apparatus according to claim 8, wherein the controller controls at least one of the display and the image forming unit to preferentially display the file specifying information for the files and the folders having the unspecific names.

10. The image forming apparatus according to claim 8, wherein the controller does not add the auxiliary identification to the filenames or the folder names of the files and the folders, which are not extracted as the unspecific names.

11. The image forming apparatus according to claim 1, wherein the controller is further operable to extract filenames or folder names of the files and the folders, which have names matching with one another at a head part thereof having a length that is displayable for each of the files and the folders on the display or by the image forming unit.

* * * * *